Sept. 2, 1924.
N. J. NIELSEN
1,507,198
CLOSING THE FILLING APERTURE OF HERMETICAL BOXES
Filed Nov. 27, 1922
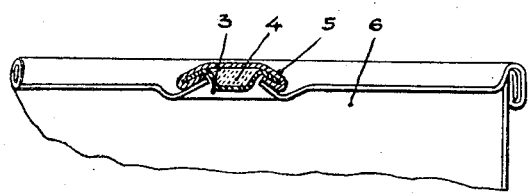
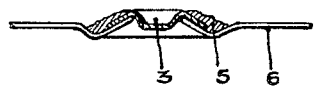

Patented Sept. 2, 1924.

1,507,198

UNITED STATES PATENT OFFICE.

NIELS JONAS NIELSEN, OF AARHUS, DENMARK.

CLOSING THE FILLING APERTURE OF HERMETICAL BOXES.

Application filed November 27, 1922. Serial No. 603,722.

*To all whom it may concern:*

Be it known that I, NIELS JONAS NIELSEN, manufacturer, of 15 Frederiksgade, Aarhus, in the Kingdom of Denmark, have invented certain new and useful Improvements in or Relating to Closing the Filling Apertures of Hermetical Boxes, of which the following is a full, clear, and exact description.

My present invention relates to the closing of hermetical boxes, especially for conserves in a fluid state, such as condensed milk or the like, able to be filled through a comparatively small aperture.

In order to close these small apertures in an easy way I employ small metallic members of iron or the like in the shape of buttons, plates, cups, or the like which are filled or supplied with a suitable flux, the metallic member and the flux being covered by a sheet of solder. Thus, by employing my present solder button or the like, containing both the metallic closing member, flux and solder, it is only necessary to supply heat.

In order to make the invention fully clear I have by way of an example illustrated it on the annexed drawing in Figs. 1 and 2 before and after the soldering respectively.

The solder button shown on the drawing, consists of a metallic plate shaped member 3 filled with a flux 4 and covered with a lid of solder 5, tin or the like, bent round the rim, see Fig. 1.

When the solder button has been placed in or on the filling aperture of the box 6, a hermetical closing is obtained just by supplying of heat, the rim of the plate joining with the edge of the filling aperture below the solder 5, cleanly fused through the action of the flux 4.

I do not confine myself to the details shown and described, but these may be altered in different ways, without departing from the scope of the invention.

I claim:

1. A disk closure for sealing an aperture in a vessel comprising two superposed metal disks, one formed of solder and the other forming a closing member, said disks being spaced apart at their central portions, and flux material arranged in the space.

2. A closure for receptacles comprising superposed disks spaced apart at a certain point, one of said disks forming a closure element and the other consisting of solder adapted to be melted for holding the closure member in engagement with the vessel, and a flux arranged in the space between the disks.

3. A closure for sealing the aperture in a receptacle comprising superposed metal disks, one of said disks being provided with a cavity containing a flux, and one of said disks consisting of solder, the solder disk extending over the edge of the other disk.

4. In combination, a receptacle provided with an opening, a disk of greater area than said opening resting on the receptacle and having a recessed portion extending in to the aperture, and a mixture of flux and solder forming a ring about the disk and securing the latter to the receptacle.

In witness whereof I subscribe my signature.

NIELS JONAS NIELSEN.